US008880208B2

(12) United States Patent
David

(10) Patent No.: US 8,880,208 B2

(45) Date of Patent: Nov. 4, 2014

(54) DEVICE AND METHOD FOR CONTROLLING THE PLAYBACK OF A FILE OF SIGNALS TO BE REPRODUCED

(75) Inventor: Dominique David, Claix (FR)

(73) Assignees: Commissariat a l'Energie Atomique et aux Energies Alternatives, Paris (FR); Movea, Grenoble (FR)

( * ) Notice: Subject to any disclaimer, the term of this patent is extended or adjusted under 35 U.S.C. 154(b) by 394 days.

(21) Appl. No.: 13/201,175

(22) PCT Filed: Feb. 12, 2010

(86) PCT No.: PCT/EP2010/051763

§ 371 (c)(1), (2), (4) Date: Nov. 22, 2011

(87) PCT Pub. No.: WO2010/092140

PCT Pub. Date: Aug. 19, 2010

(65) Prior Publication Data

US 2012/0059494 A1 Mar. 8, 2012

(30) Foreign Application Priority Data

Feb. 13, 2009 (FR) ..................................... 09 50919

(51) Int. Cl.

| | |
|---|---|
| ***G06F 17/00*** | (2006.01) |
| ***G10H 1/40*** | (2006.01) |
| ***G10H 1/00*** | (2006.01) |
| ***G10L 21/04*** | (2013.01) |
| *A63B 71/06* | (2006.01) |

(52) U.S. Cl.

CPC ........... *G10H 1/40* (2013.01); *G10H 2220/206* (2013.01); *G10H 1/0041* (2013.01); *A63B 2071/0625* (2013.01); *G10L 21/04* (2013.01); *G10H 2220/395* (2013.01); *A63B 71/0686* (2013.01); *G10H 2240/311* (2013.01)

USPC ........................................................... 700/94

(58) Field of Classification Search

None

See application file for complete search history.

(56) References Cited

U.S. PATENT DOCUMENTS 5,585,584 A 12/1996 Usa
5,662,117 A * 9/1997 Bittman ........................ 600/545
5,663,514 A * 9/1997 Usa ................................ 84/600
5,792,972 A 8/1998 Houston (Continued)

FOREIGN PATENT DOCUMENTS

DE 102 22 315 A1 12/2003
DE 102 22 355 A1 12/2003
EP 1 130 570 A 9/2001

(Continued)

OTHER PUBLICATIONS

International Search Report and Written Opinion of the ISA dated Nov. 26, 2010 issued in counterpart International Application No. PCT/EP2010/051763.

*Primary Examiner* — Fan Tsang

*Assistant Examiner* — David Siegel

(74) *Attorney, Agent, or Firm* — Strook & Stroock & Lavan LLP

(57) ABSTRACT

Controlling playback by strokes entered via a MIDI interface or measured by one or more motion sensors is disclosed. The variations of the playback speed can also be smoothed to ensure a better musical rendition. The velocity of the strokes can also be taken into account to control the volume of the audio output and other gestures or strokes can also act on the tremolo or vibrato.

13 Claims, 5 Drawing Sheets

The stroke speed is greater than that of the audio file: SF = 4/3

(56) References Cited

U.S. PATENT DOCUMENTS

| | | | | |
|---|---|---|---|---|
| 6,376,758 | B1 | 4/2002 | Yamada et al. | |
| 2007/0000374 | A1* | 1/2007 | Clark et al. | 84/724 |
| 2007/0270667 | A1* | 11/2007 | Coppi et al. | 600/300 |

FOREIGN PATENT DOCUMENTS

| | | | |
|---|---|---|---|
| EP | 1 850 318 | A | 10/2007 |
| WO | WO 98/19294 | A | 5/1998 |
| WO | WO 02/093577 | A | 11/2002 |

* cited by examiner

DEVICE AND METHOD FOR CONTROLLING THE PLAYBACK OF A FILE OF SIGNALS TO BE REPRODUCED

CROSS-REFERENCE TO RELATED APPLICATIONS

This application is the National Stage under 35 U.S.C. 371 of International Application No. PCT/EP2010/051763, filed Feb. 12, 2010, which claims priority to French Patent Application No. 0950919, filed Feb. 13, 2009 the contents of which are incorporated herein by reference.

BACKGROUND

1. Field of the Invention

Various embodiments of the invention relate to the control of the playback of an audio file in real time.

2. Description of the Prior Art

Electronic musical synthesis devices make it possible to play one or more synthetic instruments (produced from acoustic models or from samples or sounds from a piano, a guitar, other string instruments, a saxophone or other wind instruments, etc.) by using an interface for entering notes. The notes entered are converted into signals by a synthesis device connected to the interface by a connector and a software interface using the MIDI (Musical Instrument Digital Interface) standard. An automatic programming of the instrument or instruments makes it possible to generate a series of notes corresponding to a score that can be performed by using software provided for that purpose. Among such software, the MAX/MSP programming software is one of the most widely used and makes it possible to create such a musical score interpretation application. Such an application comprises a graphic programming interface which makes it possible to select and control sequences of notes and to drive the musical synthesis DSP (Digital Signal Processor). In these devices, it is possible to combine a score driven by the interface which controls one of the instruments with a score for other instruments which are played automatically. Rather than controlling synthetic instruments by a MIDI-type interface, it may be desirable to directly control an audio recording, the control making it possible, for example, to act on the playback speed and/or volume of the file. To ensure a musical synchronization of the file which is played with the playing data of the interpreter delivered by the MIDI interface, it would be particularly useful to be able to control the running rate of the score played automatically. The existing devices do not make it possible to provide this control over the playback rate of the different types of audio files used (MP3—MPEG (Moving Picture Expert Group) 1/2 Layer 3, WAV—WAVeform audio format, WMA—Windows Media Audio, etc.) to reproduce prerecorded music on an electronic piece of equipment. There is no prior art device that allows for such real-time control in conditions of musicality that are acceptable.

In particular, PCT application no. WO98/19294 deals only with the control of the playback rate of MIDI files and not of files of signals encoded in a substantially continuous manner such as mp3 or way files.

BRIEF SUMMARY

The present application provides a response to these limitations of the prior art by using an automatic score playback control algorithm which makes it possible to provide a satisfactory musical rendition.

To this end, embodiments of the present invention disclose a control device enabling a user to control the playback rate of a prerecorded file of signals to be reproduced and the intensity of said signals, said signals being encoded in said prerecorded file in a substantially continuous manner, said device comprising a first interface module for entering control strokes, a second module for entering said signals to be reproduced, a third module for controlling the timing of said prerecorded signals and a device for reproducing the inputs of the first three modules, wherein said second module can be programmed to determine the times at which control strokes for the playback rate of the file are expected, and in that said third module is capable of computing, for a certain number of control strokes, a corrected speed factor relating to strokes preprogrammed in the second module and strokes actually entered in the first module and an intensity factor relating to the velocities of said strokes actually entered and expected, then of adjusting the playback rate of said second module to adjust said corrected speed factor on the subsequent strokes to a selected value and the intensity of the signals output from the second module according to said intensity factor relating to the velocities.

Advantageously, the first module can comprise a MIDI interface. Advantageously, the first module can comprise a motion capture submodule and a submodule for analyzing and interpreting gestures receiving as input the outputs from the motion capture submodule.

Advantageously, the motion capture submodule can perform said motion capture on at least one first and one second axes, the submodule for analyzing and interpreting gestures comprises a filtering function, a function for detecting a meaningful gesture by comparing the variation between two successive values in the sample of at least one of the signals originating from at least the first axis of the set of sensors with at least one first selected threshold value and a function for confirming the detection of a meaningful gesture, and said function for confirming the detection of a meaningful gesture can compare at least one of the signals originating from at least the second axis of the set of sensors with at least one second selected threshold value.

Advantageously, the first module can comprise an interface for capturing neural signals from the brain of the user and a submodule for interpreting said neural signals.

Advantageously, the velocity of the stroke entered can be computed on the basis of the deviation of the signal output from the second sensor.

Advantageously, the first module can also comprise a submodule capable of interpreting gestures on the part of the user, the output of which is used by the third module to control a characteristic of the audio output selected from the group consisting of vibrato and tremolo.

Advantageously, the second module can comprise a submodule for placing tags in the file of prerecorded signals to be reproduced at the times at which control strokes for the playback rate of the file are expected, said tags being generated automatically according to the rate of the prerecorded signals and being able to be shifted by a MIDI interface.

Advantageously, the value selected in the third module to adjust the playback rate of the second module can be equal to a value selected from a set of computed values, of which one of the limits is computed by application of a corrected speed factor equal to the ratio of the time interval between the next tag and the preceding tag minus the time interval between the current stroke and the preceding stroke to the time interval between the current stroke and the preceding stroke and of which the other values are computed by linear interpolation between the current value and the value corresponding to that of the limit used for the application of the corrected speed factor.

Advantageously, the value selected in the third module to adjust the playback rate of the second module can be equal to the value corresponding to that of the limit used for the application of the corrected speed factor.

Embodiments of the invention also disclose a control method enabling a user to control the playback rate of a prerecorded file of signals to be reproduced and the intensity of said signals, said signals being encoded in said prerecorded file in a substantially continuous manner, said method comprising a first interface step for entering control strokes, a second step for entering said signals to be reproduced, a third step for controlling the timing of said prerecorded signals and a step for reproducing the inputs of the first three steps, wherein said second step can be programmed to determine the times at which control strokes for the playback rate of the file are expected, and in that said third step is capable of computing, for a certain number of control strokes, a corrected speed factor relating to strokes preprogrammed in the second step and strokes actually entered in the first step and an intensity factor relating to the velocities of said strokes actually entered and expected, then of adjusting the playback rate in said second step to adjust said corrected speed factor on the subsequent strokes to a selected value and the intensity of the signals output from the second module according to said intensity factor relating to said velocities.

Another advantage of embodiments of the invention is that they make it possible to control the playback of the prerecorded audio files intuitively. New playback control algorithms can also be easily incorporated in embodiment devices. The sound power of the prerecorded audio files can also be controlled simply by embodiment devices.

BRIEF DESCRIPTION OF THE DRAWINGS

FIGS. 1A, 1B and 1C represent three embodiments of the invention which differ only by the control stroke input interface module 10. The characteristics of the module 20 for entering the signals to be reproduced, of the timing rate control module 30 and of the audio output module 40 are described later. Various embodiments of the control stroke input interface module 10 are described first. At least three input interface modules are possible. They are respectively represented in FIGS. 1A, 1B and 1C. Each input module comprises a submodule 110 which captures interaction commands with the device and a part which handles the input and translation of these commands in the device.

FIG. 1A shows a MIDI-type input module 10A. The MIDI controllers 110A are control surfaces which can have buttons, faders (linear potentiometers for adjusting the level of the sound sources), pads (tactile surfaces) or rotary knobs. These controllers are not sound or restoration management peripheral devices; they produce only MIDI data. Other types of control surfaces can be used, for example a virtual harp, guitar or saxophone. These controllers may have a visualization screen. Regardless of the elements that make up the control surface, all the knobs, cursers, faders, buttons, pads can be assigned to each element of the visual interface of the software by virtue of setups (configuration files). The sound controls can also be coupled with lighting controls.

A MIDI controller 110A is linked to the time control processor 30 via an interface whose hardware part is a 5-pin DIN connector. A number of MIDI controllers can be linked to the same computer by being chained together. The communication link is set up at 31 250 bauds. The coding system uses 128 tonal values (from 0 to 127), the note messages being spread between the frequencies of 8.175 Hz and 12544 Hz with a half-tone resolution.

Figure 1A:
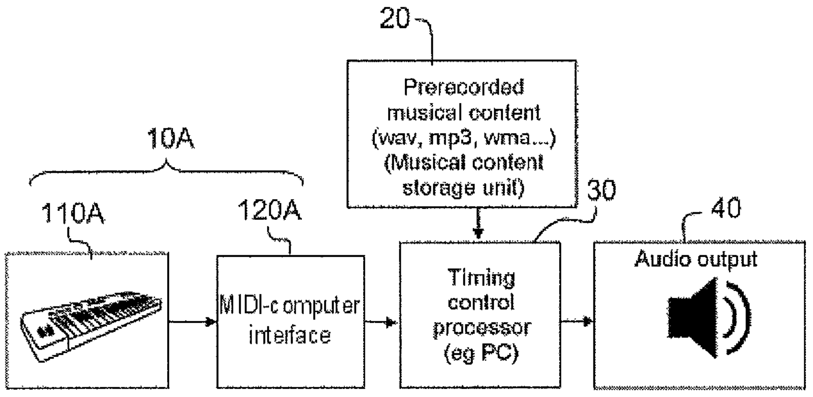
FIGS. 1A, 1B and 1C are a simplified representation of a functional architecture of a device for controlling the playback speed of a prerecorded audio file according to three embodiments of the invention.
Figure 1B:
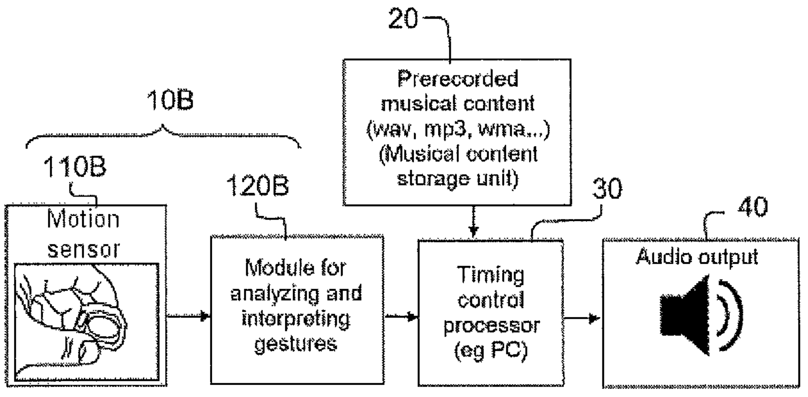

FIG. 1B shows a motion capture assembly 10B comprising a motion sensor 110B of MotionPod™ type from Movea™ and a motion analysis interface 120B. An AirMouse™ or a GyroMouse™ can also be used instead of the MotionPod, as can other motion sensors.

A MotionPod comprises a triaxial accelerometer, a triaxial magnetometer, a preprocessing capability that can be used to preform the signals from the sensors, a radiofrequency transmission module for transmitting said signals to the processing module itself and a battery. This motion sensor is said to be "3A3M" (three accelerometer axes and three magnetometer axes). The accelerometers and magnetometers are inexpensive market-standard microsensors with small bulk and low consumption, for example a three-channel accelerometer from Kionix™ (KXPA4 3628) and HoneyWell™ magnetometers of HMC1041Z type (1 vertical channel) and HMC1042L type for the 2 horizontal channels. There are other suppliers: Memsic™ or Asahi Kasei™ for the magnetometers and STMT™, Freescale™, Analog Device™ for the accelerometers, to name only a few. In the MotionPod, for the 6 signal channels, there is only an analogue filtering after which, after analogue-digital conversion (12-bit), the raw signals are transmitted by a radiofrequency protocol in the Bluetooth™ band (2.4 GHz) optimized for consumption in this type of application. The data therefore arrive raw at a controller which can receive the data from a set of sensors. The data are read by the controller and made available to the software. The sampling rate can be adjusted. By default, it is set to 200 Hz. Higher values (up to 3000 Hz, even more) may nevertheless be envisaged, allowing for a greater accuracy in the detection of impacts for example. The radiofrequency protocol for MotionPod makes it possible to ensure that the datum is made available to the controller with a controlled delay, which in this case preferably does not exceed 10 ms (at 200 Hz), which is important for the music.

An accelerometer of the above type makes it possible to measure the longitudinal displacements on its three axes and, by transformation, angular displacements (except those resulting from a rotation around the direction of the earth's gravitational field) and orientations relative to a Cartesian coordinate system in three dimensions. A set of magnetometers of the above type makes it possible to measure the orientation of the sensor to which it is fixed relative to the earth's magnetic field and therefore displacements and orientations relative to the three axes of the coordinate system (except around the direction of the earth's magnetic field). The 3A3M combination supplies complementary and smoothed motion information.

The AirMouse comprises two gyro-type sensors, each with one rotation axis. The gyrometers used are Epson brand, reference XV3500. Their axes are orthogonal and deliver the angles of pitch (rotation about the axis parallel to the horizontal axis of a plane situated facing the user of the Air-Mouse) and of yaw (rotation about an axis parallel to the vertical axis of a plane situated facing the user of the Air-Mouse). The instantaneous pitch and yaw speeds measured by the two gyro axes are transmitted by radiofrequency protocol to a controller of the movement of a curser on a screen situated facing the user.

The module for analyzing and interpreting gestures 120B supplies signals that can be directly used by the timing control processor 30. For example, the signals from an axis of the accelerometer and of the magnetometer of the MotionPod are combined according to the method described in the patent application filed by the present applicants in the patent application entitled "DEVICE AND METHOD FOR INTERPRETING MUSICAL GESTURES". The processing operations implemented in the module 120B are performed by software.

The processing operations comprise, first of all, a low-pass filtering of the outputs from the sensors of the two modalities (accelerometer and magnetometer).

This filtering of the signals output from the controller of motion sensors uses a first order recursive approach. The gain of the filter may, for example, be set to 0.3. In this case, the filter equation is given by the following formula:

$$\mathrm{Output}(z(n))=0.3*\mathrm{Input}(z(n-1))+0.7*\mathrm{Output}(z(n-1))$$

In which, for each of the modalities:

z is the reading of the modality on the axis of the sensor which is used;

n is the reading of the current sample;

n−1 is the reading of the preceding sample.

The processing then comprises a low-pass filtering of the two modalities with a cut-off frequency less than that of the first filter. This lower cut-off frequency results in the choice of a coefficient for the second filter that is less than the gain of the first filter. In the case chosen in the above example in which the coefficient of the first filter is 0.3, the coefficient of the second filter may be set to 0.1. The equation for the second filter is then (with the same notations as above):

$$\mathrm{Output}(z(n))=0.1*\mathrm{Input}(z(n-1))+0.9*\mathrm{Output}(z(n-1))$$

Then, the processing comprises a detection of a zero in the derivative of the signal output from the accelerometer with the measurement of the signal output from the magnetometer. The following notations are used:

- A(n) the signal output from the accelerometer in the sample n;
- AF1(*n*) the signal from the accelerometer output from the first recursive filter in the sample n;
- AF2(*n*) the signal AF1 filtered again by the second recursive filter in the sample n;
- B(n) the signal from the magnetometer in the sample n;
- BF1(*n*) the signal from the magnetometer output from the first recursive filter in the sample n;
- BF2(*n*) the signal BF1 filtered again by the second recursive filter in the sample n.

Then, the following equation can be used to compute a filtered derivative of the signal from the accelerometer in the sample n:

$$FDA(n)=AF1(n)-AF2(n-1)$$

A negative sign for the product FDA(n)*FDA(n−1) indicates a zero in the derivative of the filtered signal from the accelerometer and therefore detects a stroke.

For each of these zeros of the filtered signal from the accelerometer, the processing module checks the intensity of the deviation of the other modality at the filtered output of the magnetometer. If this value is too low, the stroke is considered not to be a primary stroke but to be a secondary or ternary stroke, and is discarded. The threshold for discarding the non-primary strokes depends on the expected amplitude of the deviation of the magnetometer. Typically, this value will be of the order of 5/1000 in the applications envisaged. This part of the processing therefore makes it possible to eliminate the meaningless strokes.

Figure 1C:
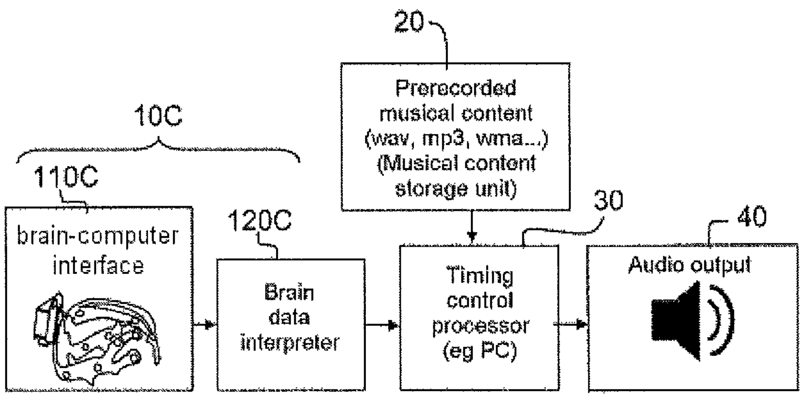

FIG. 1C comprises a brain-computer interface 10C, 110C. These interfaces are still in the advanced research stage but offer promising possibilities, notably in the area of musical interpretation. The neural signals are supplied to an interpretation interface 120C which converts these signals into commands for the timing control processor 30. Such neural devices operate, for example, as follows. A network of sensors is arranged on the scalp of the person to measure the electrical and/or magnetic activity resulting from the subject's neural activity. It is believed that currently there are no scientific models yet available that make it possible, from these signals, to identify the intention of the subject, for example, in our case, to beat time in a musical context. However, it has been possible to show that, by placing the subject in a loop associating said subject with the sensor system and with a sensory feedback, said subject is capable of learning to direct his thoughts so that the effect produced is the desired effect. For example, the subject sees a mouse pointer on a screen, the movements of the mouse pointer resulting from an analysis of the electrical signals (for example, greater electrical activity in such and such an area of the brain is reflected by higher electrical outputs from some of the activity sensors). With a certain training based on a learning-type procedure, the subject obtains a certain control of the cursor by directing his thought. The exact mechanisms are not scientifically known, but a certain repeatability of the processes is now admitted, making it possible to envisage the possibility of capturing certain intentions of the subject in the near future.

A prerecorded music file 20 in one of the standard formats (MP3, WAV, WMA, etc.) is sampled on a storage unit by a playback device. This file has another file associated with it containing timing marks or "tags" at predetermined instants; for example, the table below indicates nine tags at the instants in milliseconds which are indicated alongside the index of the tag, after the comma:

| |
|---|
| 1, 0; |
| 2, 335.411194; |
| 3, 649.042419; |
| 4, 904.593811; |
| 5, 1160.145142; |
| 6, 1462.1604; |
| 7, 1740.943726; |
| 8, 2054.574951; |
| 9, 2356.59; |

The tags can advantageously be placed at the beats of the same index in the piece which is being played. There is however no limitation on the number of tags. There are a number of possible techniques for placing tags in a piece of prerecorded music:

- manually, by searching the musical wave for the point corresponding to a rhythm where a tag is to be placed; this is a feasible but tedious process;

semiautomatically, by listening to the piece of prerecorded music and by pressing a computer keyboard or MIDI keyboard key when a rhythm where a tag to be placed is heard;

automatically, by using a rhythm detection algorithm which places the tags at the right point; it is believed that, as yet, the algorithms are not sufficiently reliable for the result not to have to be finished by using one of the first two processes, but this automation can be complemented with a manual phase for finishing the created tags file.

The module 20 for entering prerecorded signals to be reproduced can process different types of audio files, in the MP3, WAV, WMA formats. The file may also include multimedia content other than a simple sound recording. They may contain, for example, video content, with or without soundtracks, which will be marked with tags and whose playback can be controlled by the input module 10.

Figure 2A:
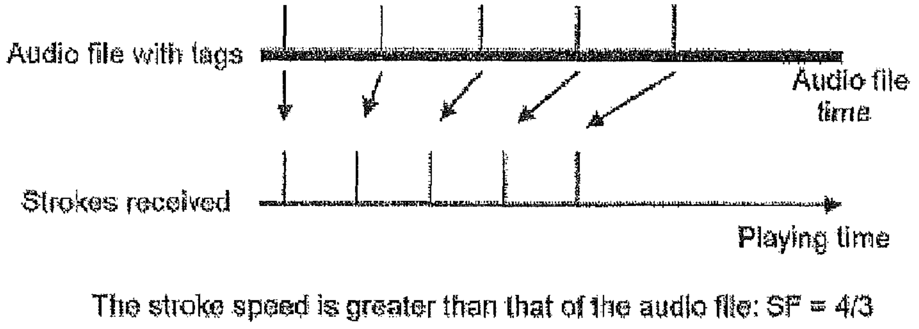
FIGS. 2A and 2B represent two cases of application of the invention in which, respectively, the stroke speed is higher/lower than that of the playback of the audio track.
Figure 2B:
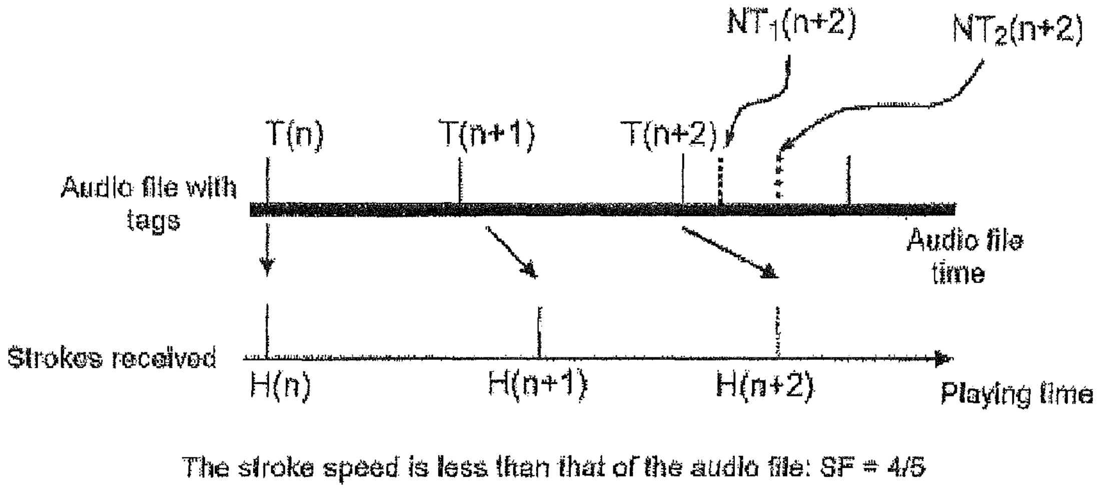

The timing control processor 30 handles the synchronization between the signals received from the input module 10 and the piece of prerecorded music 20, in a manner explained in the commentaries to FIGS. 2A and 2B.

The audio output 40 reproduces the piece of prerecorded music originating from the module 20 with the rhythm variations introduced by the input control module 10 interpreted by the timing control processor 30. This can be done with any sound reproduction device, notably headphones, and loudspeakers.

FIGS. 2A and 2B represent two cases of application of an embodiment in which, respectively, the stroke speed is higher/lower than the playback speed of the audio track.

On the first stroke entered on the MIDI keyboard 110A, identified by the motion sensor 1108 or interpreted directly as a thought from the brain 110C, the audio playback device of the module 20 starts playing the piece of prerecorded music at a given rate. This rate may, for example, be indicated by a number of small preliminary strokes. Each time the timing control processor receives a stroke signal, the current playing speed of the user is computed. This may, for example, be expressed as the speed factor SF(n) computed as the ratio of the time interval between two successive tags T, n and n+1, of the prerecorded piece to the time interval between two successive strokes H, n and n+1, on the part of the user:

$$SF(n)=[T(n+1)-T(n)]/[H(n+1)-H(n)]$$

In the case of FIG. 2A, the player accelerates and takes a lead over the prerecorded piece: a new stroke is received by the processor before the audio playback device has reached the sample of the piece of music where the tag corresponding to this stroke is placed. For example, in the case of the figure, the speed factor SF is 4/3. On reading this SF value, the timing control processor makes the playing of the file 20 jump to the sample containing the mark with the index corresponding to the stroke. A part of the prerecorded music is therefore lost, but the quality of the musical rendition is not too disturbed because the attention of those listening to a piece of music is generally concentrated on the main rhythm elements and the tags will normally be placed on these main rhythm elements. Furthermore, when the playback device jumps to the next tag, which is an element of the main rhythm, the listener who is expecting this element will pay less attention to the absence of the portion of the prerecorded piece which will have been jumped, this jump thus passing virtually unnoticed. The listening quality may be further enhanced by applying a smoothing to the transition. This smoothing may, for example, be applied by interpolating therein a few samples (ten or so) between before and after the tag to which the playback is made to jump in order to catch up on the stroke speed of the player. The playing of the prerecorded piece continues at the new speed resulting from this jump.

In the case of FIG. 2B, the player slows down and lags behind the piece of prerecorded music: the audio playback device reaches a point where a stroke is expected before said stroke is performed by the player. In a musical listening context, it is not desirable to stop the playback device to wait for the stroke. Therefore, the audio playing continues at the current speed, until the expected stroke is received. It is at this moment that the speed of the playback device is changed. One crude method includes setting the speed of the playback device according to the speed factor SF computed at the moment when the stroke is received. This method already gives qualitatively satisfactory results. A more sophisticated method includes computing a corrected playing speed which makes it possible to resynchronize the playing tempo on the player's tempo.

Three tag positions at the instant n+2 (in the time scale of the audio file) before change of speed of the playback device are indicated in FIG. 2B:

the first, starting from the left, T(n+2) is the one corresponding to the playback speed before the player slows down;

the second, $NT_1(n+2)$, is the result of the computation consisting in adjusting the playback speed of the playback device to the stroke speed of the player by using the speed factor SF; it can be seen that in this case the tags remain ahead of the strokes;

the third, $NT_2(n+2)$, is the result of a computation in which a corrected speed factor CSF is used; this corrected factor is computed so that the times of the subsequent stroke and tag are identical, which can be seen in FIG. 2B.

CSF is the ratio of the time interval of the stroke n+1 at the tag n+2 related to the time interval of the stroke n+1 at the stroke n+2. Its computation formula can be as follows:

$$CSF=\{[T(n+2)-T(n)]-[H(n+1)-H(n)]\}/[H(n+1)-H(n)]$$

It is possible to enhance the musical rendition by smoothing the profile of the tempo of the player. For this, instead of adjusting the playback speed of the playback device as indicated above, it is possible to calculate a linear variation between the target value and the starting value over a relatively short duration, for example 50 ms, and to change the playback speed through these different intermediate values. The longer the adjustment time, the smoother the transition. This provides for a better rendition, notably when numerous notes are played by the playback device between two strokes. However, the smoothing is obviously done to the detrimental of the dynamic of the musical response.

Another enhancement, applicable to the embodiment comprising one or more motion sensors, consists in measuring the stroke energy of the player or velocity to control the volume of the audio output. The way in which the velocity is measured is also disclosed in the patent application filed by the present applicants in the patent application entitled "DEVICE AND METHOD FOR INTERPRETING MUSICAL GESTURES".

For all the primary strokes detected, the processing module computes a stroke velocity (or volume) signal by using the deviation of the filtered signal at the output of the magnetometer.

By using the same notations as above in commentary to FIG. 2, the value DELTAB(n) is introduced into the sample n which can be considered as the prefiltered signal from the centered magnetometer and which is computed as follows:

$$DELTAB(n)=BF1(n)-BF2(n)$$

The minimum and maximum values of DELTAB(n) are stored between two detected primary strokes. An acceptable value VEL(n) of the velocity of a primary stroke detected in a sample n is then given by the following equation:

$$VEL(n)=\text{Max}\{DELTAB(n),DELTAB(p)\}-\text{Min}\{DELTAB(n),DELTA(p)\}$$

In which p is the index of the sample in which the preceding primary stroke was detected. The velocity is therefore the travel (max-min difference) of the derivative of the signal between two detected primary strokes, characteristic of musically meaningful gestures.

It is also possible to envisage, in this embodiment comprising a number of motion sensors, controlling, by other gestures, other musical parameters such as the spatial origin of the sound (or panning), the vibrato or the tremolo. For example, a sensor in a hand will make it possible to detect the stroke whereas another sensor held in the other hand will make it possible to detect the spatial origin of the sound or the tremolo. Rotations of the hand may also be taken into account: when the palm of the hand is horizontal, a value of the spatial origin of the sound or of the tremolo is obtained; when the palm is vertical, another value of the same parameter is obtained; in both cases, the movements of the hand in space provide the detection of the strokes.

In the case where a MIDI keyboard is used, the controllers conventionally used may also be used in this embodiment of the invention to control the spatial origin of the sounds, the tremolo or the vibrato.

The invention can advantageously be implemented by processing the strokes via a MAX/MSP program.

Figure 3:
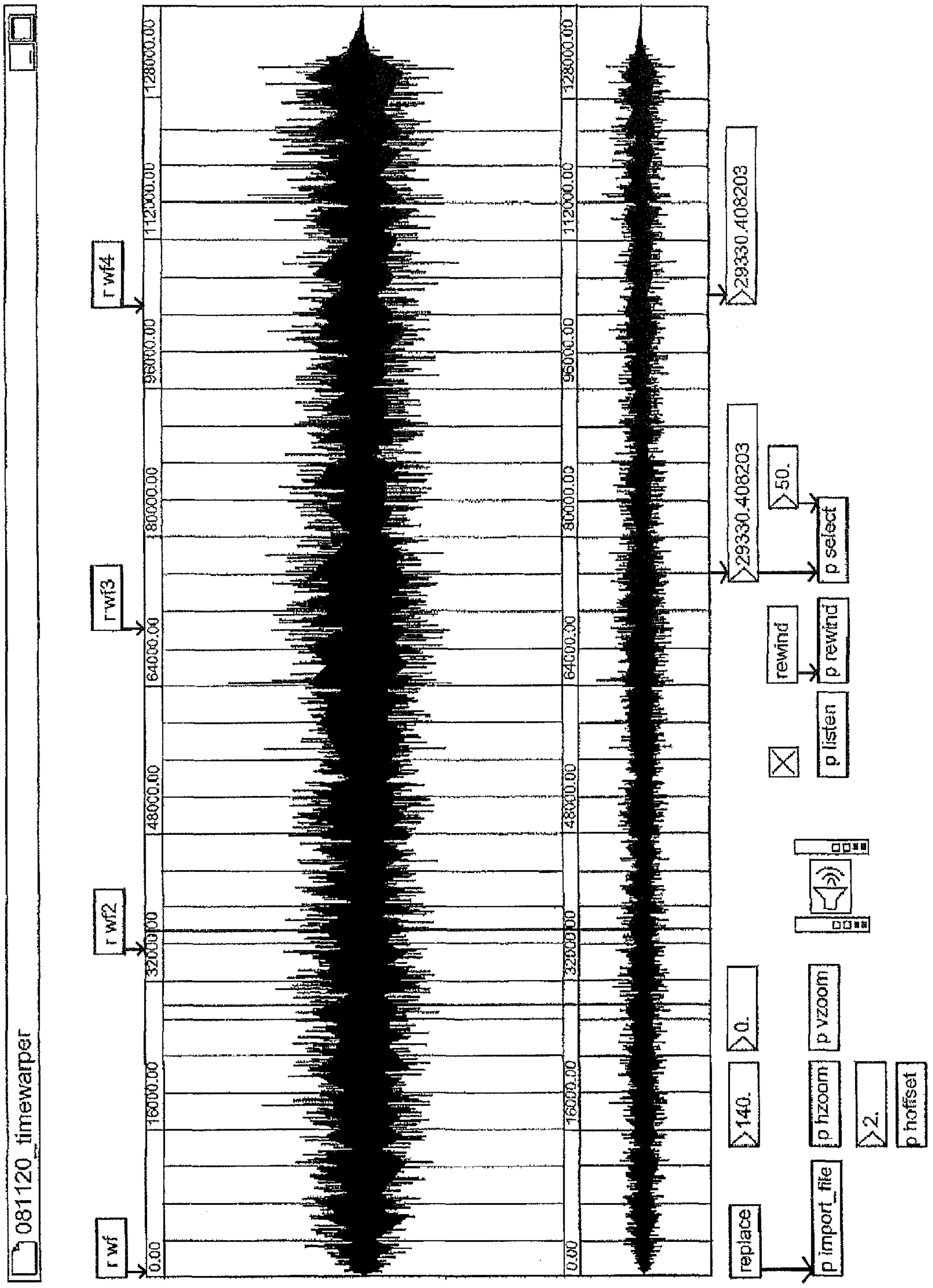
FIG. 3 is a general flow diagram of the processing operations in one embodiment of the invention.

FIG. 3 represents the general flow diagram of the processing operations in such a program.

Figure 4:
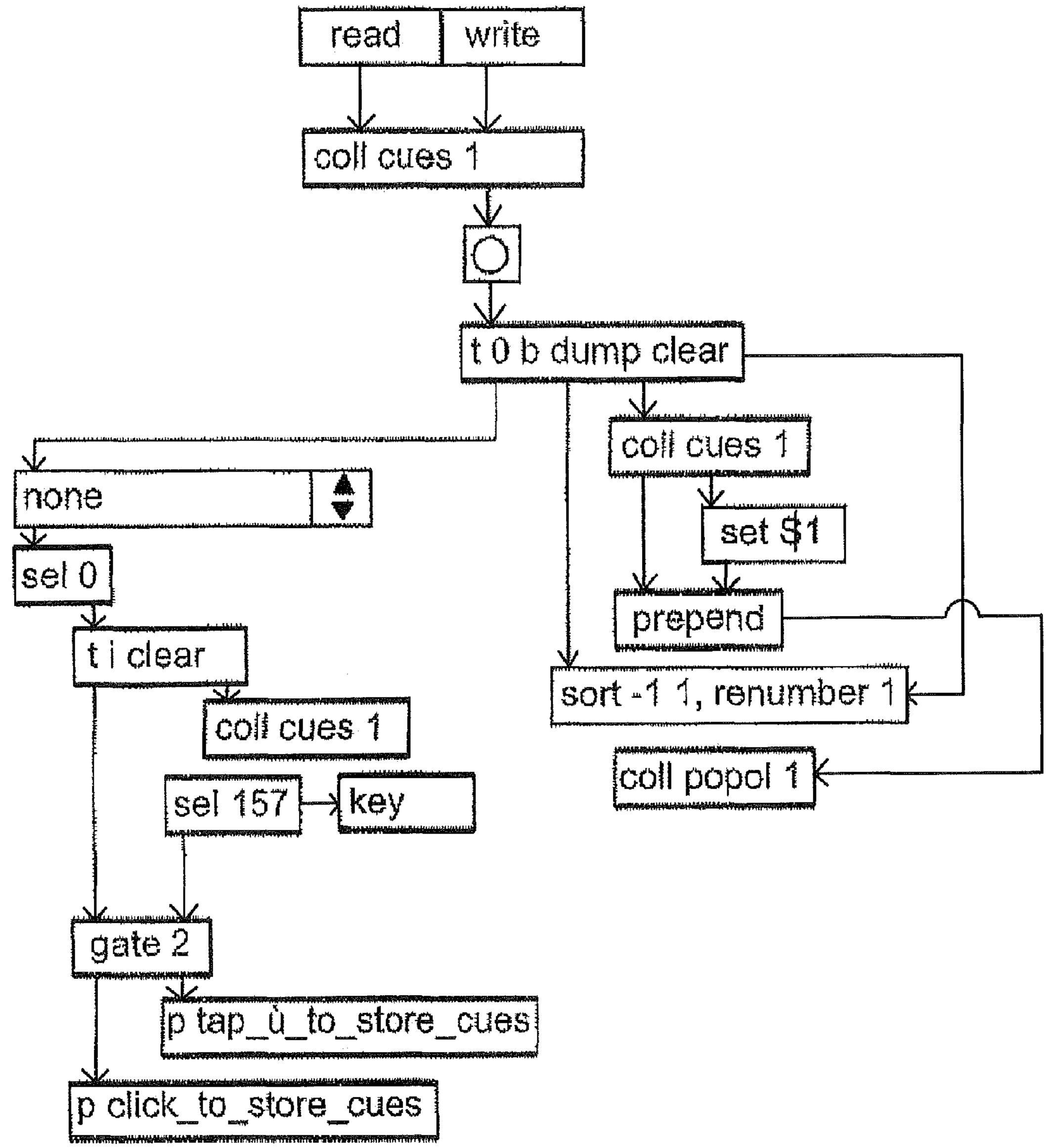
FIG. 4 represents a detail of FIG. 5 which shows the rate control points desired by a user of a device according to one embodiment of the invention.

The display shows the waveform associated with the audio piece loaded into the system. There is a conventional part for listening to the original piece. Bottom left there is a part, represented in FIG. 4, making it possible to create a table containing the list of the rhythm control points desired by the person: on listening to the piece, he taps on a key at each instant when he wants to tap on subsequent interpretation. Alternatively, these instants may be designated by the mouse on the waveform. Finally, they can be edited.

Figure 5:
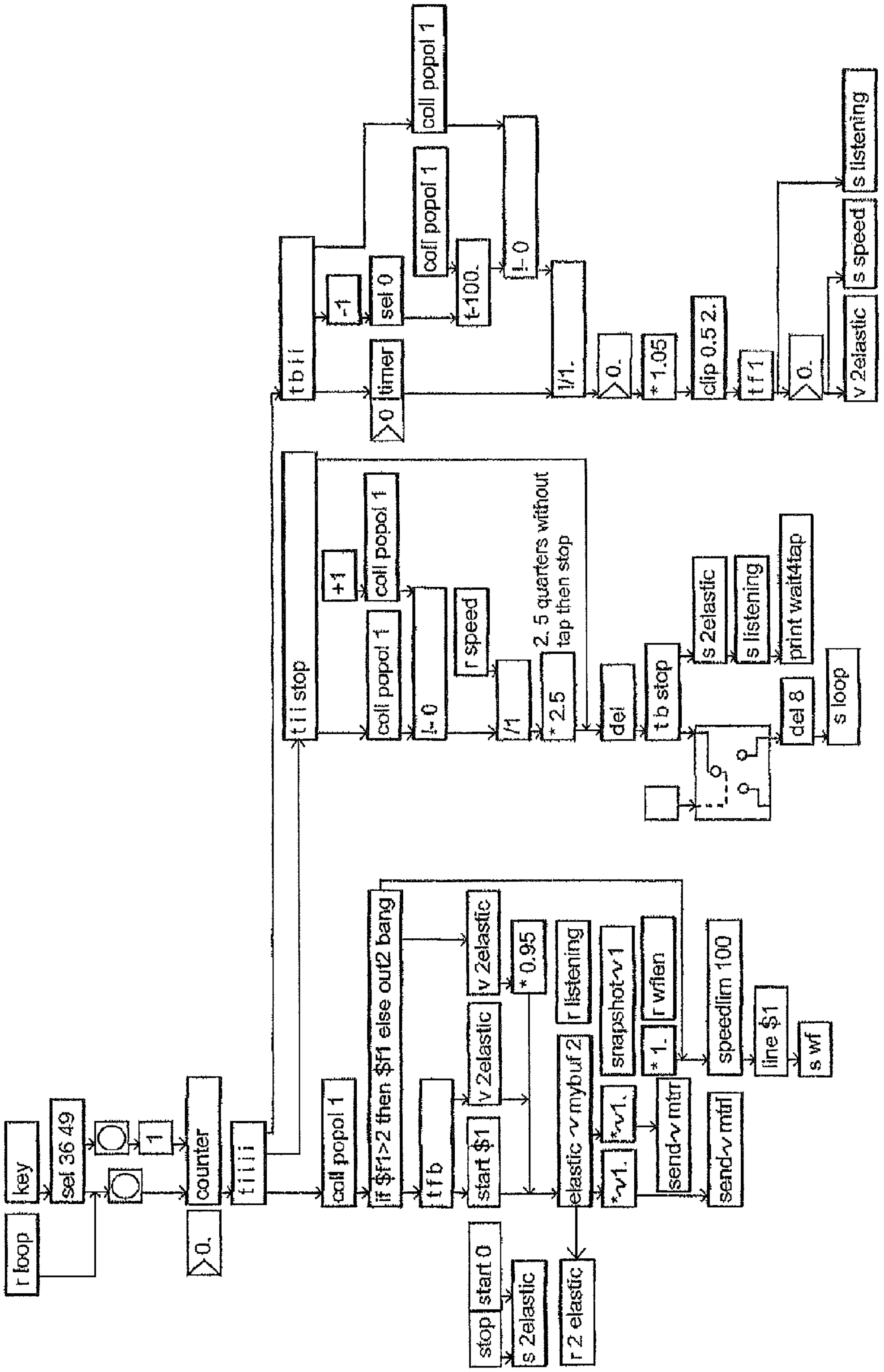
FIG. 5 is a developed flow diagram of a timing control method in one embodiment of the invention.

FIG. 5 details the part of FIG. 3 located bottom right which represents the timing control which is applied.

In the right hand column, the acceleration/slowing down coefficient SF is computed by comparison between the period between two consecutive strokes on the one hand in the original piece and on the other hand in the actual playing of the user. The formula for computing the speed factor is given above in the description. In the central column, a timeout is set in order to stop the audio playback if the user makes no further stroke for a time dependant on the current musical content. The left hand column contains the core of the control system. It relies on a timing compression/expansion algorithm. The difficulty is in transforming a "discrete" control, therefore a control occurring at consecutive instants, into an even modulation of the speed. By default, the listening suffers on the one hand from total interruptions of the sound (when the player slows down), and on the other hand from clicks and abrupt jumps when said player speeds up. These defects, which make such an approach unrealistic because of a musically unusable audio output, are resolved by the various embodiment implementations developed, which include:

in never stopping the sound playback even in the case of substantial slowdown on the part of the user; the "if" object of the left hand column detects whether the current phase is a slowing-down or acceleration phase; in the slowing-down case, the playing speed of the algorithm is modified, but there is no jump in the audio file; the new playing speed is not necessarily precisely that calculated in the right hand column (SF), but may be corrected (speed factor CSF) to take account of the fact that the marker corresponding to the last action of the player has already been passed;

in performing a jump in the audio file in the event of an acceleration (second branch of the "if" object); in this precise case, there is little subjective impact on the listening, if the control markers correspond to musical instants that are psycho-acoustically musically important (there is here a parallel to be made with the basis of the MP3 compression, which poorly codes the insignificant frequencies and richly encodes the predominant frequencies); what we are talking about here is the macroscopic time domain; certain instants in the listening of a piece are more meaningful than others, and it is on these instants that it is desirable to act.

The examples described above are given as an illustration of embodiments of the invention. They in no way limit the scope of the invention which is defined by the following claims.

The invention claimed is:

1. A control device enabling a user to control a playback rate of a prerecorded file of signals, said signals being encoded in said prerecorded file in a continuous manner, said device comprising a first interface module for inputting control strokes, a second module for inputting said signals, a third module for controlling a timing of said signals and a reproducing device for reproducing inputs of at least some of the first three modules, said second module being programmed to determine times at which control strokes for a playback rate of the prerecorded file of signals are expected, said third module is programmed to compute, for a certain number of control strokes, a corrected speed factor relating to strokes preprogrammed as tags in the second module and strokes actually entered in the first module, wherein said corrected speed factor is determined by at least a ratio having as a numerator a time interval between a next tag and a preceding tag minus a time interval between a current stroke and a preceding stroke and as a denominator a time interval between the current stroke and the preceding stroke.

2. The control device of claim 1, wherein the first module comprises a MIDI interface.

3. The control device of claim 1, wherein the first module comprises a motion capture submodule and a submodule for analyzing and interpreting gestures received as input outputs from the motion capture submodule.

4. The control device of claim 3, wherein the motion capture submodule performs motion capture along at least one first and one second axes, and the submodule for analyzing and interpreting gestures comprises a filtering function, a function for detecting a meaningful gesture by comparing variation between two successive values in a sample of at least one signal originating along at least the first axis from a set of sensors with at least one first selected threshold value and a function for confirming detection of a meaningful gesture, the function for confirming the detection of a meaningful gesture comparing at least one signal originating along at least the second axis from the set of sensors with at least one second selected threshold value.

5. The control device of claim 1, wherein the first module comprises an interface for capturing neural signals from a brain of the user and a submodule for interpreting said neural signals.

6. The control device of claim 1, wherein the third module is further programmed to compute an intensity factor relating to velocities of said strokes actually entered and expected based on the tags, and then adjusting the playback rate of said second module to adjust said corrected speed factor on the subsequent strokes to a selected value and an intensity of the signals output from the second module according to said intensity factor relating to the velocities.

7. The control device of claim 1, wherein the first module further comprises a submodule configured to interpret gestures from the user, an output of which is used by the third module to control a characteristic of audio output selected from a group consisting of vibrato and tremolo.

8. The control device of claim 1, wherein the second module comprises a submodule for placing tags in the prerecorded file of signals to be reproduced at times at which control strokes for the playback rate of the prerecorded file of signals are expected, said tags being generated automatically according to a rate of the signals and being shiftable by a MIDI interface.

9. The control device of claim 1, wherein a value selected in the third module to adjust the playback rate of the second module is determined according to at least a value selected from a set of computed values, of which at least one limit is computed by application of the corrected speed factor and of which the other computed values are computed by linear interpolation between a current value and a value corresponding to that of a limit used for application of the corrected speed factor.

10. The control device of claim 9, wherein the value selected in the third module to adjust the playback rate of the second module is equal to the value corresponding to that of the limit used for the application of the corrected speed factor.

11. A control method enabling a user to control a playback rate of a prerecorded file of signals, said signals being encoded in said prerecorded file in a continuous manner, said method comprising a first interface step for inputting control strokes, a second step for inputting said signals, a third step for controlling a timing of said signals and a reproducing step for reproducing inputs of at least some of the first three steps, said second step further comprising determining times at which control strokes for the playback rate of the prerecorded file of signals are expected, said third step further comprising computing, for a certain number of control strokes, a corrected speed factor relating to strokes preprogrammed as tags in the second step and strokes actually entered in the first step, wherein said corrected speed factor is determined according to at least a ratio having as a numerator a time interval between a next tag and a preceding tag minus a time interval between a current stroke and a preceding stroke and as a denominator a time interval between the current stroke and the preceding stroke.

12. The method of claim 11, wherein the third step further comprises determining an intensity factor relating to velocities of said strokes actually entered and expected based on the tags, and then adjusting the playback rate of said second step to adjust said corrected speed factor on the subsequent strokes to a selected value and an intensity of the signals output from the second step according to said intensity factor relating to the velocities.

13. The control device of claim 6, wherein the velocity of each stroke entered is computed on a basis of a deviation of a signal output from a sensor.

* * * * *